United States Patent Office 2,904,523
Patented Sept. 15, 1959

2,904,523

STORAGE-STABLE PASTES, PAINTS, INKS AND SIMILAR PRODUCTS CONTAINING ALUMINOUS PIGMENTS

Robert L. Hawkins, Jr., Gates Mills, and Edward G. Bobalek, Cleveland Heights, Ohio, assignors to The Empire Varnish Company, Cleveland, Ohio, a corporation of Ohio No Drawing. Application November 7, 1955
Serial No. 545,542

18 Claims. (Cl. 260—8)

This invention relates to the manufacture, storage and use of a variety of water-based paints, inks and similar compositions containing aluminum in the form of a pigment; to the products, intermediate and final, that are involved in or result from their formulation, preparation and application; and to the processes and techniques by which such products can be made.

The use of aluminum pigments for paints, inks, and the like in mixtures containing appreciable quantities of water has long been desirable because of the unique properties of aluminum pigments and because of the advantages of water dispersions. Such mixtures, however, have found only limited commercial use because of the well-known tendencies of aluminum pigments to react rapidly and vigorously in mixtures of this kind, even when the pH is at or near the neutral point and the dissolved electrolytes are as low as 100 parts per million. Heretofore, the useful life of such mixtures has been usually a matter of hours. Attempts at extension have resulted in frothing, large volume increase in the liquids due to and accompanied by the evolution of hydrogen gas, and conversion of the aluminum to various salts.

Because of the amphoteric nature of aluminum, this problem is not one that can be overcome with adjustment of the pH. Also, the degree and ease of the reactions which take place in such mixtures are greatly different from those ordinarily encountered in aluminum structures, vessels, tools, etc. The discrepancy in reactivity is undoubtedly due, at least in part, to the microscopic degree of subdivision found in aluminum pigments, wherein surface areas are of the order of 6,000 to 50,000 square centimeters per gram. Until now, short of mixing at the point of use, there has been no satisfactory solution to the problem.

One of the objects of this invention is the stabilization of aluminum pigments in water mixtures which are useful for paints, inks and the like. The invention involves the use in these mixtures of soluble chromate salts or silicate salts and the adjustment of the pH within certain ranges. Examples of salts which are useful for these purposes are potassium chromate, potassium dichromate, the corresponding sodium salts, ammonium chromate, zinc chromate pigment, sodium silicate, potassium silicate, potassium tetrasilicate, and the like. The life of the mixtures is thereby extended by 30 to 200 times or more, which is sufficient to make them vastly more useful in commerce.

Another object of the invention is the provision of ready-mixed storage-stable paints containing aluminum pigments wherein water is at once the principal volatile component of the liquid vehicle and the common dispersing medium for the droplets or particles of the binder and the pigments which provide color and opacity in the final paint film. Frequently the use of an aluminum pigment for all or part of the pigment ingredients results in novel and interesting color effects which cannot be duplicated using any other material as a substitute for the aluminum pigment. The provision of storage-stable paints of this sort is made possible by the incorporation of salts of the kinds previously mentioned.

Other objects, advantages and features of the invention will be apparent from the general description and detailed examples which follow.

A common and convenient commercial practice blending pigment colorants into a paint is to prepare first several pastes each containing at high concentration a single pigment in the minimum quantity of the liquid vehicle required to make possible a homogeneous and finely dispersed pigment. These pigment pastes can readily be blended in varying proportions with additional liquid vehicle by a simple mixing operation. This procedure of blending pigments in the form of pre-wet pastes into a finished paint allows for easier adjustment of color and in fact makes possible the mixing of pigments that sometimes cannot be accomplished at all if the dry pigments and other colorants are added to the total quantity of liquid vehicle required by the complete paint formula.

However, this preferred procedure of utilizing predispersed and concentrated pigment pastes is feasible only if such pastes are storage-stable in a liquid vehicle that is compatible with the larger quantity of liquid vehicle with which it will be mixed in compounding the complete paint formula. If the major vehicle of the complete paint is water, then best results are obtained if the dispersing vehicle of the pigment paste also contains only water and water-soluble substances such as protective colloids. Where the pigment is an aluminum pigment, this gives rise to the aforementioned reactivity problem.

The use of chemical additions to inhbit this reaction of aluminum with the aqueous vehicle during the preparation and storage of aqueous aluminum pastes under particular and controlled conditions may be regarded as one aspect of the present invention. The primary conditions are (1) control of the pH between outside limits of roughly 2 and 11 as measured by a meter of the glass-calomel type calibrated against standard buffer solutions and (2) the use of a minimum concentration of the inhibitive chemical. It is known that after a certain minimum concentration of inhibitor is reached, surplus quantities of the same chemical usually have relatively little advantage.

Two classes of compounds have been found effective as stabilizers to prevent excessive reaction of aluminum with aqueous vehicles in the pH range of 2 to 11. Foremost are the chromate salts, exemplified by sodium chromate, sodium dichromate, potassium chromate, potassium dichromate, zinc chromate and barium chromate. In general, while the presence of hexavalent chromium in the make-up of the salt appears to be important, the nature of the cation can vary widely. For example, sodium, potassium, barium, strontium, zinc, ammonium, and others of the same types can be used without markedly affecting the results. Some of these salts, such as the alkali metal chromates, are highly water soluble; others, such as zinc chromate and barium chromate, are sparingly soluble in water.

In the later instance, where the water-soluble portion is consumed by reactions that promote inhibition of the reactivity of aluminum with water, more of the residual undissolved chromate passes into solution, thereby maintaining a steady supply of soluble chromate in quantities sufficient to stabilize the paste. Sometimes, for reasons of paint formulation (such as control of the color) it is feasible to use smaller quantities of a highly soluble chromate. Sometimes, for still other reasons (such as promoting freeze-thaw stability of the paint) it is desirable to maintain the quantity of the water-dissolved electrolyte at a low level; in such circumstances it is convenient to use the more sparingly soluble chromates.

A second class of inhibitors comprises the soluble silicates such as sodium silicate, potassium silicate, potassium tetrasilicate, etc. In most applications these are not as effective as are the hexavalent chromium salts, but they can be used in unusual instances such as when some other constituent of the paint, such as an unstable organic colorant, is unable to tolerate the presence of chromates without degradation. Sodium silicate is preferred for the purposes of the invention, particularly sodium silicates of the grade commonly referred to as "Water Glass."

Examples illustrating how the invention may be utilized in the preparation of stable pastes are set forth immediately below.

EXAMPLE A

| | Gm. |
|---|---|
| Alcoa standard aluminum lining powder No. 408 | 110 |
| Methyl cellulose (100–400 cps.), 5% in water | 220 |
| Water | 50 |
| Potassium chromate, 10% in water | 50 |

This paste can be prepared by mixing the methyl cellulose solution with the aluminum powder until a stiff paste is formed, continuing mixing for several minutes until the paste is free from lumps. The water is added slowly to preserve the smoothness of the paste after which the potassium chromate solution is added. A paste so made is stable for periods in excess of thirty days, whereas a similar paste not so stabilized would show gassing within twenty-four hours.

EXAMPLE B

| | Gm. |
|---|---|
| Alcoa aluminum litho powder No. 552 | 110 |
| Sodium caseinate, 15% in water | 220 |
| Water | 50 |
| Potassium chromate, 10% in water | 50 |
| Nitric acid, 10% in water | q.s. |

This paste is prepared by mixing the sodium caseinate solution with the aluminum powder until a stiff paste is formed, continuing mixing until the paste is free from lumps. Water is added slowly to preserve the smoothness of the paste, after which the potassium chromate solution is added. The nitric acid solution is added by titration until the pH drops to about 10. This paste is stable for periods in excess of thirty days. A similar paste not so stabilized would show gassing within twenty-four hours.

EXAMPLE C

| | Gm. |
|---|---|
| Alcoa standard aluminum lining powder No. 408 | 110 |
| Sodium caseinate, 15% in water | 220 |
| Water | 50 |
| Sodium dichromate, 10% in water | 50 |
| Nitric acid, 10% in water | q.s. |

This paste is prepared as in Example B except that sodium dichromate is used in place of potassium chromate.

EXAMPLE D

| | Gm. |
|---|---|
| Alcoa standard aluminum lining powder No. 408 | 110 |
| Sodium caseinate, 15% in water | 220 |
| Water | 50 |
| Zinc chromate, 10% in water | 50 |
| Nitric acid, 10% in water | q.s. |

This paste, which uses zinc chromate as the inhibitor, is prepared as in Examples B and C.

EXAMPLE E

| | Gm. |
|---|---|
| Alcoa standard aluminum lining powder No. 408 | 110 |
| Sodium caseinate, 15% in water | 220 |
| Water | 50 |
| Barium chromate, 10% in water | 50 |
| Nitric acid, 10% in water | q.s. |

This paste, using barium chromate, is prepared as in Examples B, C and D.

EXAMPLE F

| | Gm. |
|---|---|
| Alcoa standard aluminum lining powder No. 408 | 110 |
| Sodium caseinate, 15% in water | 220 |
| Water | 50 |
| Sodium silicate, grade N, 40° B., 10% in water | 50 |

This is prepared by mixing the sodium caseinate solution with the aluminum powder until a stiff paste is formed, continuing the mixing until the paste is smooth. Water is added slowly to preserve the smoothness of the paste. The sodium silicate solution is then added. Should it appear that excess alkali is present, nitric acid solution may be added by titration until the pH drops to about 10.

In the foregoing examples, reference has been made to two different aluminum powders the characteristics of which, together with the characteristics of other aluminum powders that are suitable for use in the practice of the invention, are set forth in the tabulation which follows:

*Alcoa standard varnish powder No. 322*

| | |
|---|---|
| Average mesh size | Less than 0.5% on 100 mesh, 92% thru 325 mesh (400 mesh designation). |
| Average leafing value | 80% 2 gm. |
| Approx. sp. gravity | 2.55 |
| Water covering | 11,000 sq. cm./gm. |
| Type | Leafing. |

*Alcoa lining powder No. 408 (standard)*

| | |
|---|---|
| Average mesh size | 99% thru 325 mesh. |
| Average leafing value | 85% 2.2 gm., 70% 1.0 gm. |
| Approx. sp. gravity | 2.50. |
| Water covering | 19,000 sq. cm./gm. |
| Type | Leafing. |

*Alcoa extra fine lining powder No. 422*

| | |
|---|---|
| Average mesh size | 100% thru 325 mesh. |
| Average leafing value | 85% 1.5 gm., 75% 1.0 gm. |
| Approx. sp. gravity | 2.50. |
| Water covering | 31,000 sq. cm./gm. |
| Type | Leafing. |

*Standard litho powder No. 524*

| | |
|---|---|
| Average mesh size | Less than 0.2% on 100 mesh, 90% thru 325 mesh. |
| Average leafing value | None. |
| Water covering | None. |
| Type | Non-leafing, polished, low grease. |

*Alcoa litho powder No. 552*

| | |
|---|---|
| Average mesh size | 98% thru 325 mesh. |
| Average leafing value | None. |
| Approx. sp. gravity | 2.66. |
| Type | Non-leafing, polished, low grease. |

*Alcoa standard unpolished powder No. 606*

| | |
|---|---|
| Average mesh size | Less than .2% on 100 mesh, 90% thru 325 mesh. |
| Approx. sp. gravity | 2.67. |
| Type | Non-leafing, unpolished, very low grease. |

From the foregoing, it will be apparent that the mesh size of the aluminum powder may vary from 100 to 400. In general, however, the powders of the higher mesh designations are preferred. It is ordinarily immaterial whether the powders are of the "leafing" or "non-leafing" type. If of the "leafing" type, the nature of the grease is usually not important. If of the "non-leafing" type, the aluminum may be "polished" or "unpolished." The aluminum powders given in the foregoing tabulations are made by the Aluminum Company of America, but powders of comparable characteristics made by other manufacturers are no less useful for the purposes of the invention. In either case, aluminum alloys are often just as useful as unalloyed aluminum.

Assuming that the aluminum powder comprises from one percent to seventy-five percent of the paste, a typical paste will have present in it also from 0.4% to 10% of the preferred water-soluble salt of chromic acid or silicic acid. The remainder is largely water, including both that part of the water which is added to thin out the paste and that part which is added in other forms, as with the sodium caseinate in Examples B to F, inclusive. Differently expressed, the water-soluble chromate or silicate may be described as present in a concentration of from 0.05% to 30% of the weight of the total water in the paste.

The sodium caseinate is representative of a broad class of substances which function in the paste as protective colloids. For convenience protective colloids that are used primarily for their thickening function, such as sodium caseinate, are hereinafter referred to simply as "thickeners." In lieu of sodium caseinate, it is practicable to use ammonium caseinate, amine-dissolved casein, methyl cellulose, hydroxy ethyl cellulose, carboxy methyl cellulose, alpha protein, gum tragacanth, polyacrylic acid, polyvinyl alcohol, sodium polyacrylate and various other polymeric electrolytes of the same or similar nature. The thickening function being a physical function, it is evident that any one of a wide variety of thickeners may be used for the purpose in place of those specifically mentioned. In those cases in which it is added to the paste in the form of a slurry, the thickener forms part of an aqueous medium comprising from 50% to 99.75% water. The thickener itself comprises from 0.25% to 50% of such aqueous medium.

Pastes made up as above described may be stored without deterioration for relatively long periods of time, upwards of thirty days. This makes it possible to package them up in sealed cans without having to expect bloating of the cans within a matter of hours or at most a few days after the pastes have been compounded. The stability of these pastes persists notwithstanding subsequent dilution or extension, thus permitting the paste to be shipped as such and formed at its destination into a paint. If desired, however, the paint may of course be compounded at the point of origin and shipped in full body. In either case, the pastes are particularly useful for formulation into what are usually referred to as "polychrome finishes," examples which are set forth below. Such finishes may be either oil-based or water-based.

Polychrome finishes provide unusual color effects that can be produced as a rule only by the admixture of an aluminous pigment with various other colorants. The color has a pleasing metallic sheen and a decided variation of tone when the paint is subject to different types, intensities, or angles of illumination. This effect can be produced at its best if the pigments used along with the aluminum have a low degree of opacity and a strong tinctorial strength. This is a characteristic of such organic colorants as phthalocyanine blue, phthalocyanine green, benzedine yellow, Hansa yellow, pyrazalone red, toluidine red, etc., but in some degree desirable effects are obtained with nearly all pigments, organic and inorganic, that are compatible with metallic aluminum. By metallic aluminum is meant either pure aluminum or alloys of aluminum with other metals which can be comminuted to a particle size sufficiently small to form homogeneous mixtures in liquid vehicles, having in mind that the pigment must have satisfactory non-settling characteristics.

The use of metallic aluminum in non-aqueous paints has long been standard practice such finishes have found frequent application in automotive finishing, home interior decoration and a variety of other applications. In recent years, a definite trend has developed toward use of paints wherein part of the liquid vehicle consists of water instead of volatile and flammable and odoriferous organic solvents. From the viewpoint of economics and elimination of fire and health hazards, water is a desirable substitute for organic thinners; moreover, many resinous binders can be used more conveniently in water paints than in solvent paints. One serious limitation that is applicable to water paints is the fact that the water reacts with certain metals, including aluminum, as a result whereof the range of possibilities for developing novel colors is less with water paints than with competitive paints where the thinner is an organic solvent.

Particularly is this true of aluminum pigments, which, as already explained, tend to react in an aqueous vehicle to cause frothing, bubbling, dangerous pressures in closed containers, and the potential explosive hazard occasioned by the release of hydrogen. This reactivity of aluminum can be minimized somewhat if the pH of the aqueous vehicle is maintained close to neutrality. This, however, is difficult or impossible to maintain in paints because of the effects of the other paint constituents in altering the pH. For example, to stabilize many resin emulsions or latices used as binders, agents need be present that increase the pH to 8 or more. In other instances, trace decompositions of the binder itself produce acids that lower the pH to less than 7.

Since the aluminum pigment tends to react with the aqueous medium if it is used at all in such paints, it has been necessary in the past to mix it with the paint just before putting the paint to use. This is a serious inconvenience. First of all, such mixing cannot be done everywhere as well as it can be done by the paint manufacturer. Also, such part of the completely mixed paint as is not immediately used up will deteriorate, since it cannot be repackaged for storage. These and other difficulties are sufficiently important to preclude the widespread use of water paints to produce the novel decorative effects that come about from the use of an aluminum pigment. Obviously, it is of great potential advantage to minimize or elimate the troublesome chemical reactions which cause the gassing problem. The solution of this difficulty would make possible the factory manufacture of complete water-based paints containing metallic aluminum.

Water-based paints usually contain latices derived from water-insoluble polymers. Typical polymers are acrylic ester copolymers, vinyl chloride polymers, vinyl chloride-vinyl acetate copolymers, vinyl chloride-vinylidene chloride copolymers, vinyl acetate polymers and copolymers, styrene-butadiene copolymers, and acrylonitrile-butadiene copolymers, all of which may be described as being polymers of at least one vinylidene monomer; i.e., a monomer characterized by the presence of the bivalent vinylidene grouping ($H_2C:C=$). Examples of typical latices, together with the respective manufacturers, are given in the following tabulation.

*Dow Latex 744-B (Dow Chemical Company)*

| | |
|---|---|
| Type | Vinyl chloride-vinylidene chloride copolymer. |
| Solids | 50.0±0.5. |
| pH | 8.0±0.5. |
| Particle size | 0.2 micron. |
| Film forming | No. |
| Sp. gr. latex | 1.195. |
| Sp. gr. solids | 1.48. |
| Ref. index sol | 1.539±0.003. |
| Visc. latex | 20 cps. |
| M.P. solids | 164° C. |

*Rhoplex AC–33 (Rohm & Haas Company)*

| | |
|---|---|
| Type | Acrylic ester copolymer. |
| Solids | 46–47%. | pH _____ 9.0–9.5.
Film forming _____ Yes.
Sp. gr. latex _____ 1.04.
Sp. gr. solids _____ 1.09.
Visc. latex _____ 65–80 Krebs units.

*Geon 576 (B. F. Goodrich Chemical Company)*

Type _____ Plasticized polyvinyl chloride.
Solids _____ 54.0–56.5%.
pH _____ 8.5.
Chg _____ Negative.
Dispersant _____ Anionic.
Particle size _____ 0.2 micron.
Film forming _____ Yes.
Sp. gr. latex _____ 1.120–1.132.
Sp. gr. solids _____ 1.26.
Visc. latex _____ 27–47 cps. (Brookfield).

*Hycar 1552 (Hycar Chemical Company)*

Type _____ Acrylonitrile-butadiene copolymer (35% acrylonitrile).
Solids _____ 48–53.
pH _____ 8.4.
Dispersant _____ Anionic.
Particle size _____ 1800–2000 Angstrom units.
Film forming _____ Yes.
Sp. gr. latex _____ 0.98.
Visc. latex _____ 35 cps. (Brookfield).

*Dow latex 512–K (Dow Chemical Company)*

Type _____ 60/40 styrene/butadiene copolymer.
Solids _____ 48.
pH _____ 10±1.
Particle size _____ 0.2 micron.
Film forming _____ Yes.
Sp. gr. latex _____ 1.005.
Sp. gr. solids _____ 1.01.
Visc. latex _____ 10–12 sec. No. 4 Ford cup.
Ref. index sol _____ 1.57.
Tensile _____ 300–800 p.s.i.
Elongation _____ 700–1000%.

*Bakelite WCD–130 (Union Carbide & Carbon Corporation)*

Type _____ Polyvinyl acetate.
Solids _____ 58.5±1.5.
pH _____ 4.5±0.5.
Dispersant _____ Non-ionic.
Particle size _____ 3–7 microns.
Film forming _____ Yes.
Sp. gr. latex _____ 1.104.
Visc. latex _____ 1,500 to 2,500 cps. (Brookfield).

Water-based paints derived from the foregoing and similar latices include (along with other ingredients) dispersed particles of water-insoluble synthetic resins and suitable plasticizers of average particle diameter in the range of 500 or less to 20,000 or more Angstrom units, the usual weight ratio of plasticizer to resin not being in excess of about 2. Usually, as will appear, inhibitors can be added to water-based paints of this kind which prevent or markedly reduce the gas-producing reaction of metallic aluminum. In general, these are the previously described inhibitors containing hexavalent chromium, such as sodium chromate, sodium dichromate, potassium chromate, potassium dichromate, zinc chromate, barium chromate, ammonium chromate and the like. Where hexavalent salts are undesirable for any of the reasons that are familiar to the paint formulator, the soluble silicate salts can be used although in general these are somewhat less effective than are the chromate and dichromate salts. Examples are given immediately below.

EXAMPLE A

Prepare the following dispersion (dispersion No. 1):

|  | Gm. |
|---|---|
| Phthalocyanine green pigment | 7 |
| Latex: Geon 576 | 600 |
| Sodium polyacrylate, 8% in water | 60 |
| Water | 160 |

Then prepare the following paste (paste No. 1):

|  | Gm. |
|---|---|
| Aluminum powder | 11 |
| Sodium polyacrylate, 8% in water | 22 |
| Water | 22 |
| Potassium chromate, 10% in water | 5 |

Stir paste No. 1 into dispersion No. 1, maintaining the pH in the range of 7.5 to 10.5 measured by means of a glass electrode. A water-based paint so prepared will be stable in excess of thirty days under ordinary storage conditions. A similar paint, prepared without the inhibitor which is the subject of this invention, will show instability within two to eighteen hours, depending on the original pH.

EXAMPLE B

Prepare the following dispersion (dispersion No. 2):

|  | Gm. |
|---|---|
| Phthalocyanine green pigment | 7 |
| Latex: Polyvinyl acetate WCD–130 | 550 |
| Sodium polyacrylate, 8% in water | 60 |
| Water | 210 |

Add paste No. 1, but maintain the pH between 3.0 and 7.5 as measured by the glass electrode.

EXAMPLE C

Prepare the following dispersion (dispersion No. 3):

|  | Gm. |
|---|---|
| Phthalocyanine green pigment | 7 |
| Dow latex 512 K | 600 |
| Sodium polyacrylate, 8% in water | 60 |
| Water | 160 |

Stir paste No. 1 into dispersion No. 3 to create a paint. The pH should be maintained in a range of 7.5 to 10.5, measured by means of a glass electrode.

EXAMPLE D

Prepare the following dispersion (dispersion No. 4):

|  | Gm. |
|---|---|
| Phthalocyanine green pigment | 7 |
| Latex: Rhoplex AC–33 | 600 |
| Water | 160 |

Stir paste No. 1 into dispersion No. 4. The pH should be maintained in a range of 7.5 to 10.5 as measured by the glass electrode.

EXAMPLE E

Prepare the following dispersion (dispersion No. 5):

|  | Gm. |
|---|---|
| Indo maroon toner | 12 |
| Latex: Geon 576 | 600 |
| Sodium polyacrylate, 8% in water | 60 |
| Water | 160 |

Stir in paste No. 1 to create a polychromatic decorative paint. The pH should be maintained in a range of 7.5 to 10.5 as measured by the glass electrode.

EXAMPLE F

Prepare the following dispersion (dispersion No. 6):

|  | Gm. |
|---|---|
| Latex: Geon 576 | 600 |
| Sodium polyacrylate, 8% in water | 60 |
| Water | 160 |

Then prepare the following paste (paste No. 2):

| | Gm. |
|---|---|
| Aluminum powder | 33 |
| Sodium polyacrylate, 8% in water | 22 |
| Water | 22 |
| Potassium chromate, 10% in water | 5-30 |

Stir paste No. 2 into dispersion No. 6 to create a polychromatic decorative paint. The pH should be maintained in a range of 7.5 to 10.5, measured by the glass electrode. Prepared as above, this paint will be stable under ordinary storage conditions for a period of time in exces of thirty days. A similar paint, prepared without an inhibitor, will show instability within two to eighteen hours, depending on the original pH.

EXAMPLE G

Prepare the following dispersion (dispersion No. 7):

| | Gm. |
|---|---|
| Phthalocyanine green pigment | 7 |
| Latex: Geon 576 | 600 |
| Carboxy methyl cellulose (400 cps.), 3% in water | 40 |
| Water | 160 |

Then prepare paste No. 1 and stir it into dispersion No. 7 to create a polychromatic paint. As before, the pH should be maintained in a range of 7.5 to 10.5, measured by the glass electrode.

EXAMPLE H

Prepare the following dispersion (dispersion No. 8):

| | Gm. |
|---|---|
| Phthalocyanine green pigment | 7 |
| Latex: Geon 576 | 600 |
| Sodium polyacrylate, 8% in water | 60 |
| Water | 160 |

Then prepare paste No. 3 as follows:

| | Gm. |
|---|---|
| Aluminum powder | 11 |
| Sodium polyacrylate, 8% in water | 22 |
| Water | 22 |
| Zinc chromate pigment slurry, 10% in water | 5 |

Stir paste No. 3 into dispersion No. 8 to create a polychromatic paint. The pH should be maintained in a range of 7.5 to 10.5.

EXAMPLE I

Prepare the following dispersion (dispersion No. 9):

| | Gm. |
|---|---|
| Phthalocyanine green pigment | 7 |
| Latex: Geon 576 | 600 |
| Sodium polyacrylate, 8% in water | 60 |
| Water | 160 |

Then prepare paste No. 4 as follows:

| | Gm. |
|---|---|
| Aluminum powder | 11 |
| Sodium polyacrylate, 8% in water | 22 |
| Water | 22 |
| Barium chromate, 10% in water | 5 |

Stir paste No. 4 into dispersion No. 9, maintaining the pH in a range of 7.5 to 10.5.

EXAMPLE J

Prepare the following dispersion (dispersion No. 10):

| | Gm. |
|---|---|
| Phthalocyanine green pigment | 7 |
| Latex: Geon 576 | 600 |
| Sodium polyacrylate, 8% in water | 60 |
| Water | 160 |

Then prepare paste No. 5 as follows:

| | Gm. |
|---|---|
| Aluminum powder | 11 |
| Sodium polyacrylate, 8% in water | 22 |
| Water | 22 |
| Sodium dichromate, 10% in water | 5 |

Stir paste No. 1 into dispersion No. 10, maintaining the pH in a range of 7.5 to 10.5.

EXAMPLE K

Prepare the following dispersion (dispersion No. 11):

| | Gm. |
|---|---|
| Phthalocyanine green pigment | 7 |
| Latex: Geon 576 | 600 |
| Sodium polyacrylate, 8% in water | 60 |
| Water | 160 |

Then prepare paste No. 6 as follows:

| | Gm. |
|---|---|
| Aluminum powder | 11 |
| Sodium polyacrylate, 8% in water | 22 |
| Water | 22 |
| Sodium silicate, 10% in water | 5 |

Stir paste No. 1 into dispersion No. 11 maintaining the pH in a range of 7.5 to 10.5.

As in Example A, all of the paints of Examples B to K, inclusive, will remain stable for a minimum period of thirty days and often longer, even under ordinary conditions of storage. In all cases other than Example B, care must be taken to be sure that too much acid material is not added as an inhibitor to an alkaline latex. The latex in Example B is an acid latex, requiring no such precaution.

Wide deviations from the foregoing examples and from the following generalization may be expected, but in a general way it may be said that this phase of the invention has to do, in its preferred forms, with a storage-stable water-based paint comprising (A) an aqueous dispersing liquid of pH 3 or less to 10 or more consisting of (a) 30% to 99% water by weight, (b) a water-soluble hexavalent chromium salt present in a weight ratio of about 0.005 of salt to 1.0 of water, and (c) the balance protective colloids; e.g., thickeners, emulsifying agents, and the like; (B) dispersed particles of water-insoluble resins and plasticizers having an average particle diameter of 500 or less to 20,000 or more Angstrom units with a weight ratio of up to about 2.0 of plasticizer to 1.0 of resin; and (C) a mixture of aluminous pigment and other water-insoluble pigments with a weight ratio of from 0.001 to 10.0 of the former to 1.0 of the latter, the weight ratios of (C) to (A) ranging from 7 to 5 at one extreme to 1 to 190 at the other and the weight ratios of (C) to (B) ranging from 3 to 2 on one hand to 1 to 59 on the other. In the case of all of these weight ratios, departures will readily suggest themselves to those skilled in the arts to which the invention pertains.

Water-based paints of these and related types may be applied to a wide variety of products, including products of wood, metal, glass, synthetic resins, chemically hardened paperboard, vulcanized fiber, vulcanized rubber, etc. Among the vulcanized rubber products, a particularly good example is in the case of automobile floor mats to which compositions of the types described adhere tenaciously over unexpectedly long periods of time, notwithstanding rough use in the meanwhile. Another field of use is in interior decorating, wherein these and similar compositions may be used for novelty effects. Although water-based, such compositions provide much the same polychrome finish that has been possible heretofore only in the case of solvent-based paints. If desired, the organic or other colorant that is used to obtain the polychrome effect may be omitted, in which case the metallic luster of the aluminum pigment will of course be dominant.

Water-based paints of the kinds hereinabove referred to may to advantage be prepared in accordance with the directions already given; however, other procedures within the skill of the experienced paint formulator may be used if desired. Procedures so devised may or may not employ pastes analogous to those described in the preceding examples. If, however, the formulator elects to use such a paste, he may if desired formulate it in such a way as to incorporate the colorant. Whether or not colorants are included, such pastes may be used in other ways than those above set forth, as, for example, in oil-based paints. Such paints can frequently tolerate substantial quantities of water; accordingly, the use therein of pastes containing water is not precluded. In some circumstances, the pastes themselves, suitably extended, may be used as paints without adding to them or adding them to dispersions comparable to those described above in connection with the formulation of water-based paints. Numerous other changes can be expected to suggest themselves to those skilled in the arts to which the invention pertains.

It is intended that the patent shall cover, by summarization in the appended claims, all features of patentable novelty residing in the invention.

What is claimed is:

1. A pigment paste taking the form of a storage-stable mixture of an aluminum powder of a mesh size between 100 and 400; an aqueous vehicle comprising, by weight, from 50% to 99.75% water and from 0.25% to 50% of a water-dispersible thickener; and a frothing inhibitor comprising a water-soluble inorganic chromium salt in which the chromium is present in hexavalent form, the frothing inhibitor comprising from 0.4% to 10% by weight of the pigment paste, the aluminum powder comprising from 1% to 75% thereof, and the balance being made up substantially entirely of the aqueous vehicle.

2. A storage-stable pigment paste according to claim 1 in which the frothing inhibitor is an alkali-metal chromate.

3. A storage-stable pigment paste according to claim 1 in which the frothing inhibitor is an alkali-metal dichromate.

4. A storage-stable pigment paste according to claim 1 in which the frothing inhibitor is barium chromate.

5. A storage-stable pigment paste according to claim 1 in which the frothing inhibitor is zinc chromate.

6. A storage-stable pigment paste according to claim 1 in which the thickener is sodium caseinate.

7. A polychrome paint comprising (A) a storage-stable mixture of an aqueous dispersing liquid of pH between 2 and 11 consisting essentially of (a) 30% to 99% water by weight, (b) a water-soluble inorganic hexavalent chromium salt present in a weight ratio of about 0.005 of salt to 1.0 of water, and (c) the balance water-miscible protective colloids; (B) dispersed particles of water-insoluble polymers of at least one monomer of the vinylidene group, said particles having an average particle diameter of 500 to 20,000 Angstrom units; and (C) a mixture of aluminum powder and other water-insoluble pigments with a weight ratio of from 0.001 to 10.0 of the former to 1.0 of the latter, the weight ratios of (C) to (A) ranging from 7 to 5 on one hand to 1 to 90 on the other and the weight ratios of (C) to (B) ranging from 3 to 2 on one hand to 1 to 59 on the other.

8. A storage-stable paint according to claim 7 wherein the water-insoluble polymer is a polyvinyl chloride.

9. A storage-stable paint according to claim 7 wherein the water-insoluble polymer is a polyvinyl acetate.

10. A storage-stable paint according to claim 7 wherein the water-insoluble polymer is a polyacrylate ester.

11. A storage-stable paint according to claim 7 wherein the water-insoluble polymer is an acrylonitrile-butadiene copolymer.

12. A storage-stable paint according to claim 7 wherein the water-insoluble polymer is a vinyl chloride-vinyl acetate copolymer.

13. A storage-stable paint according to claim 7 wherein the chromium salt is an alkali-metal chromate.

14. A storage-stable paint according to claim 7 wherein the chromium salt is an alkali-metal bichromate.

15. A storage-stable paint according to claim 7 using as a thickener a water-dispersible cellulose derivative selected from a group consisting of methyl cellulose, hydroxy ethyl cellulose and carboxy methyl cellulose.

16. A storage-stable paint according to claim 7 using a water-dispersible solubilized casein as a thickener.

17. A storage-stable paint according to claim 7 using a water-dispersible polyvinyl alcohol as a thickener.

18. A storage-stable paint according to claim 7 using sodium polyacrylate as a thickener.

References Cited in the file of this patent

UNITED STATES PATENTS

| | | |
|---|---|---|
| 1,765,676 | Jones | June 24, 1930 |
| 2,355,889 | O'Loughlin | Aug. 15, 1944 |
| 2,378,432 | Rethwisch | June 19, 1945 |
| 2,432,465 | Babcock | Dec. 9, 1947 |
| 2,587,266 | Wray et al. | Feb. 26, 1952 |
| 2,587,268 | Roberts | Feb. 26, 1952 |
| 2,587,657 | Schulte et al. | Mar. 4, 1952 |

FOREIGN PATENTS

| | | |
|---|---|---|
| 406,445 | Great Britain | Mar. 1, 1934 |

OTHER REFERENCES

Ephraim: "Inorganic Chemistry" (1943), Nordeman Publishing Co., Inc., New York, N.Y., page 476.